United States Patent
Murakami et al.

(10) Patent No.: US 8,665,404 B2
(45) Date of Patent: Mar. 4, 2014

(54) LIQUID CRYSTAL CELL SUBSTRATE, LIQUID CRYSTAL CELL, LIQUID CRYSTAL PANEL, AND LIQUID CRYSTAL DISPLAY

(75) Inventors: Nao Murakami, Ibaraki (JP); Hiroyuki Yoshimi, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 606 days.

(21) Appl. No.: 12/809,796

(22) PCT Filed: Oct. 29, 2008

(86) PCT No.: PCT/JP2008/069637
§ 371 (c)(1),
(2), (4) Date: Jun. 21, 2010

(87) PCT Pub. No.: WO2009/081658
PCT Pub. Date: Jul. 2, 2009

(65) Prior Publication Data
US 2010/0271580 A1    Oct. 28, 2010

(30) Foreign Application Priority Data
Dec. 21, 2007  (JP) .................. 2007-329405

(51) Int. Cl.
*G02F 1/1337*  (2006.01)

(52) U.S. Cl.
USPC ........................................... 349/118

(58) Field of Classification Search
None
See application file for complete search history.

(56) References Cited

U.S. PATENT DOCUMENTS

| | | | |
|---|---|---|---|
| 4,088,507 A | 5/1978 | Tanaka et al. |
| 4,221,606 A | 9/1980 | Funatsu et al. |
| 4,664,714 A | 5/1987 | Katsura et al. |
| 6,208,397 B1 | 3/2001 | Shimodaira et al. |
| 6,331,882 B1 | 12/2001 | Shimodaira et al. |
| 6,819,382 B2 | 11/2004 | Yamaoka et al. |
| 7,494,689 B2 | 2/2009 | Hayashi et al. |

(Continued)

FOREIGN PATENT DOCUMENTS

| | | |
|---|---|---|
| CN | 1908773 A | 2/2007 |
| CN | 101218523 A | 7/2008 |

(Continued)

OTHER PUBLICATIONS

Chinese Office Action dated Apr. 11, 2012, issued in corresponding Chinese Patent Application No. 200880122110.8, with Partial translation (8 pages).

(Continued)

*Primary Examiner* — Thanh-Nhan P Nguyen
(74) *Attorney, Agent, or Firm* — Westerman, Hattori, Daniels & Adrian, LLP

(57) ABSTRACT

The present invention provides a liquid crystal cell substrate, a liquid crystal panel, and a liquid crystal display whose thicknesses and weights can be reduced and optical characteristics at the time of producing them are easily controlled. The liquid crystal cell substrate 10 of the present invention is a liquid crystal cell substrate including a resin substrate 11 and an optical compensation layer 12, and the optical compensation layer 12 is laminated on the resin substrate 11. The optical compensation layer 12 has a refractive index distribution satisfying nx≥ny>nz, and the optical compensation layer 12 is formed by applying a material for forming an optical compensation layer to the resin substrate 11 or a base substrate that is different from the resin substrate 11.

10 Claims, 1 Drawing Sheet

(56) References Cited

U.S. PATENT DOCUMENTS

| | | | |
|---|---|---|---|
| 7,906,184 B2 * | 3/2011 | Umemoto et al. | 428/1.3 |
| 2002/0140888 A1 | 10/2002 | Nishiyama et al. | |
| 2003/0156235 A1 * | 8/2003 | Kuzuhara et al. | 349/96 |
| 2004/0100599 A1 | 5/2004 | Yamaoka et al. | |
| 2005/0058781 A1 | 3/2005 | Hayashi et al. | |
| 2006/0062934 A1 * | 3/2006 | Hayashi et al. | 428/1.31 |
| 2006/0164580 A1 * | 7/2006 | Ueda et al. | 349/117 |
| 2010/0110353 A1 * | 5/2010 | Doi et al. | 349/118 |
| 2010/0141873 A1 | 6/2010 | Kinjo et al. | |

FOREIGN PATENT DOCUMENTS

| | | |
|---|---|---|
| JP | 52-132031 A | 11/1977 |
| JP | 54-062227 A | 5/1979 |
| JP | 56-061461 A | 5/1981 |
| JP | 57-15620 B2 | 3/1982 |
| JP | 59-40172 B2 | 9/1984 |
| JP | 60-088185 A | 5/1985 |
| JP | 63-17102 B2 | 4/1988 |
| JP | 63-305173 A | 12/1988 |
| JP | 5-9469 B2 | 2/1993 |
| JP | 6-258629 A | 9/1994 |
| JP | 2000-81514 A | 3/2000 |
| JP | 2000-162584 A | 6/2000 |
| JP | 3162860 B2 | 5/2001 |
| JP | 2003-287623 A | 10/2003 |
| JP | 2003-287750 A | 10/2003 |
| JP | 2004-46065 A | 2/2004 |
| JP | 2005-91625 A | 4/2005 |
| KR | 2002-0077220 A | 10/2002 |
| TW | 200801610 A | 1/2008 |

OTHER PUBLICATIONS

Korean Decision of Final Rejection dated Mar. 29, 2012, issued in corresponding Korean Patent Application No. 10-2010-7009498, with Partial Translation (8 pages).

Japanese Office Action dated Mar. 2, 2012, issued in corresponding Japanese Patent Application No. 2007-329405, with partial translation.

Chinese Office Action dated Jun. 16, 2011, issued in corresponding Chinese Patent Application No. 200880122110.8. (w/partial English translation).

International Search Report of PCT/JP2008/069637, mailing date of Dec. 2, 2008.

Korean Office Action dated Jul. 25, 2011, issued in corresponding Korean Patent Application No. 10-2010-7009498. (w/partial English translation).

Korean Office Action dated Aug. 30, 2012, issued in corresponding Korean Patent Application No. 10-2012-7017827, with Partial Translation (9 pages).

Korean Notification of Reasons for Refusal dated Mar. 29, 2013, issued in corresponding Korean Patent Application No. 10-2012-7017827, with partial translation (9 pages).

Chinese Notification of Decision of Rejection dated Apr. 7, 2013, issued in corresponding Chinese Patent Application No. 200880122110.8, with partial translation (10 pages).

Notification of Result of Pre-Trial Reexamination dated Jul. 2, 2013, issued in corresponding Korean Patent Application No. 10-2012-7017827, w/English translation.

* cited by examiner

LIQUID CRYSTAL CELL SUBSTRATE, LIQUID CRYSTAL CELL, LIQUID CRYSTAL PANEL, AND LIQUID CRYSTAL DISPLAY

TECHNICAL FIELD

The present invention relates to a liquid crystal cell substrate, a liquid crystal cell, a liquid crystal panel, and a liquid crystal display.

BACKGROUND OF THE INVENTION

Conventionally, with the aim of reducing a thickness, a weight, and a cost of a liquid crystal display, various analyses to substitute a glass substrate used for a liquid crystal panel with a resin substrate have been carried out. The liquid crystal display is basically configured so that glass substrates each on a flat plate provided with a transparent electrode are arranged to face each other through spacers so as to have a constant distance gap, a liquid-crystalline material is poured between the glass substrates and then sealed, thereby obtaining a liquid crystal cell, and further, polarizing plates are provided on exterior laterals of a pair of glass substrates. Since a resin substrate is inferior in smoothness and heat resistance to a glass substrate, the technology in which each layer is formed on a smooth glass substrate, heat-treated, and thereafter transferred on a resin substrate is proposed (for example, see Patent Document 1). However, controlling optical characteristics such as controlling a compounding ratio of optically active groups in an optical compensation layer formed of a material having the optically active groups has been difficult.
Patent Document 1: Japanese Patent No. 3162860

BRIEF SUMMARY OF THE INVENTION

The present invention is intended to provide a liquid crystal cell substrate, a liquid crystal panel, and a liquid crystal display whose thicknesses and weights can be reduced and optical characteristics at the time of producing them are easily controlled.

In order to achieve the aforementioned object, the liquid crystal cell substrate of the present invention is a liquid crystal cell substrate including a resin substrate and an optical compensation layer, the optical compensation layer being laminated on the resin substrate, wherein the optical compensation layer has a refractive index distribution satisfying nx≥ny>nz, and the optical compensation layer is formed by applying a material for forming an optical compensation layer to the resin substrate or a base substrate that is different from the resin substrate.
nx: a refractive index in a direction (a slow axis direction) in which an in-plane refractive index of the optical compensation layer reaches its maximum
ny: a refractive index in a direction (a fast axis direction) that is orthogonal to the nx direction within a plane of the optical compensation layer
nz: a refractive index in a thickness direction of the optical compensation layer that is orthogonal to each of the nx and ny directions The refractive index distribution satisfying nx≥ny>nz refers to a refractive index distribution satisfying nx>ny>nz or nx=ny>nz.

The liquid crystal cell of the present invention is a liquid crystal cell including a pair of liquid crystal cell substrates and a liquid crystal layer, and the liquid crystal layer is held between the pair of liquid crystal cell substrates. At least one of the pair of liquid crystal cell substrates is the liquid crystal cell substrate of the present invention.

The liquid crystal panel of the present invention is a liquid crystal panel including a liquid crystal cell of the present invention.

The liquid crystal display of the present invention is a liquid crystal display including a liquid crystal panel of the present invention.

The liquid crystal cell substrate of the present invention is obtained by laminating an optical compensation layer on a resin substrate, whereby reducing a weight and a cost of the liquid crystal cell substrate can be achieved as compared with those of the conventional liquid crystal cell substrate using a glass substrate. Further, the optical compensation layer has a refractive index distribution satisfying nx≥ny>nz and is formed by applying a material for forming an optical compensation layer to the resin substrate or a base substrate that is different from the resin substrate. Thus, optical characteristics can be easily designed and controlled at the time of producing it. Furthermore, it becomes possible not to additionally provide an optical compensation cell, an optical compensation film, or the like. Thus, reducing thicknesses and weights of a liquid crystal cell, a liquid crystal panel, and a liquid crystal display can be achieved.

DETAILED DESCRIPTION OF THE INVENTION

Figure 1:
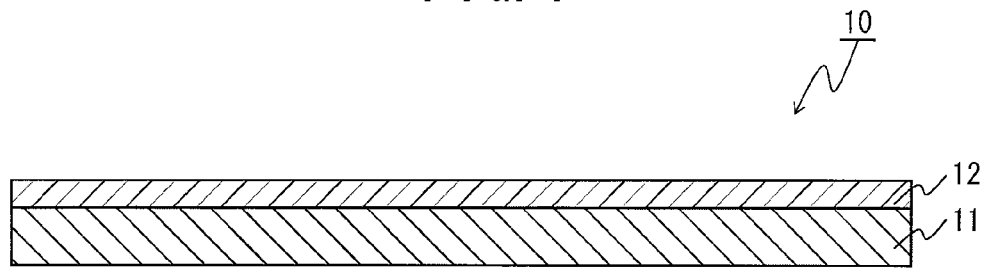
FIG. 1 is a schematic sectional view showing an example of the configuration of a liquid crystal cell substrate of the present invention.

In the liquid crystal cell substrate of the present invention, preferably, the optical compensation layer is formed by applying the material for forming an optical compensation layer to the resin substrate, and the resin substrate and the optical compensation layer are laminated directly to each other.

In the liquid crystal cell substrate of the present invention, preferably, the optical compensation layer is an optical compensation layer laminated on the resin substrate formed by applying the material for forming an optical compensation layer to the base substrate and thereafter transferring the optical compensation layer from the base substrate to the resin substrate, and the resin substrate and the optical compensation layer are laminated through an adhesive layer or a pressure-sensitive adhesive layer.

In the liquid crystal cell substrate of the present invention, when the liquid crystal cell substrate is arranged in a liquid crystal cell, the resin substrate preferably is placed between the optical compensation layer and a liquid crystal layer.

In the liquid crystal cell substrate of the present invention, the optical compensation layer preferably is formed of at least one non-liquid crystalline polymer selected from the group consisting of polyamides, polyimides, polyesters, polyetherketones, polyamideimides, and polyesterimides.

In the liquid crystal cell substrate of the present invention, the resin substrate preferably contains at least one resin selected from the group consisting of polyolefin resins, polysulfide resins, epoxy resins, phenol resins, diallyl phthalate resins, polyimide resins, polyphosphazene resins, polyarylate resins, polyethersulfone resins, polysulfone resins, polymethyl methacrylate resins, polyetherimide resins, polyamide resins, poly diallyl phthalate resins, and poly isobonyl methacrylate resins.

In the liquid crystal cell substrate of the present invention, the resin substrate preferably contains an epoxy resin.

In the liquid crystal cell of the present invention, the liquid crystal cell substrate of the present invention preferably is arranged so that the optical compensation layer is placed between the resin substrate and the liquid crystal layer.

Next, the present invention will be described in detail. However, the present invention is not limited by the following description.

In the present invention, "nx=ny" not only means that they are completely the same, but also encompasses the case where they are substantially the same. Therefore, for example, when it is described that nx=ny, it encompasses the case where an in-plane retardation value Re(590) (=(nx−ny)× d, where d is a thickness (nm) of an optical compensation layer) of the optical compensation layer that will be described in examples is less than 10 nm.

The liquid crystal cell substrate of the present invention is produced by the first producing method (hereinafter referred to as a direct method) including the steps of: preparing a resin substrate and a material for forming an optical compensation layer; and applying the material for forming an optical compensation layer on the resin substrate, for example.

Further, the liquid crystal cell substrate of the present invention is produced also by the second producing method (hereinafter referred to as a transcription method) including steps of: preparing a resin substrate and a material for forming an optical compensation layer; forming an optical compensation layer by applying the material for forming an optical compensation layer to a base substrate that is different from the resin substrate; forming an adhesive layer or a pressure-sensitive adhesive layer on the resin substrate or on the formed optical compensation layer; attaching the resin substrate and the optical compensation layer through the adhesive layer or the pressure-sensitive adhesive layer; and transferring the optical compensation layer from the base substrate to the resin substrate, for example.

The transcription method can also include the step of: shrinking or stretching the base substrate together with the optical compensation layer formed on the base substrate before the transcription step. By including this step, a liquid crystal cell substrate having a biaxial optical compensation layer that has a refractive index distribution satisfying nx>ny>nz can be produced.

An example of the configuration of the liquid crystal cell substrate of the present invention is shown in a schematic sectional view of FIG. 1. In FIG. 1, the sizes, proportions, and the like of the respective components are different from the actual sizes, proportions, and the like for the sake of simplicity in illustration. As shown in FIG. 1, this liquid crystal cell substrate 10 is configured so that a resin substrate 11 and an optical compensation layer 12 are laminated in this order. The optical compensation layer 12 is formed directly on the resin substrate 11 by applying. A liquid crystal cell substrate having the configuration shown in FIG. 1 can be produced by the direct method.

Figure 2:
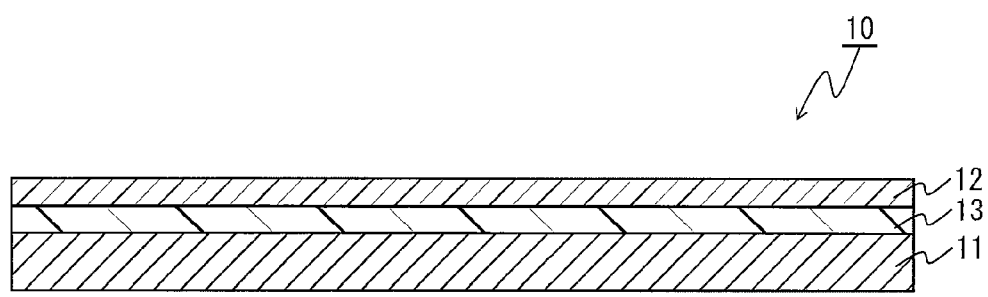
FIG. 2 is a schematic sectional view showing another example of the configuration of a liquid crystal cell substrate of the present invention.

Another example of the configuration of a liquid crystal cell substrate of the present invention is shown in a schematic sectional view of FIG. 2. In this example, as shown in FIG. 2, an optical compensation layer 12 is formed on a resin substrate 11 through an adhesive layer or a pressure-sensitive adhesive layer 13. The liquid crystal cell substrate having the configuration shown in FIG. 2 can be produced also by the transcription method.

The resin substrate that can be used for the liquid crystal cell substrate of the present invention preferably has superior transparency and impact resistance. A light transmittance in an entire wavelength range of visible light in the range of 400 to 700 nm is preferably 80% or more, and more preferably 85% or more. The glass transition temperature is preferably 130° C. or more, more preferably 150° C. or more, and optimally 160° C. or more from the viewpoint of heat resistance and the like at the time when a transparent electrode film and the like are formed. Further, the resin substrate preferably has superior chemical resistance, optical isotropy, low water absorbability, and a gas barrier property such as an oxygen barrier property and the like from the viewpoint of durability, deterioration prevention of a liquid crystal, and the like.

The content of a volatile component in the resin substrate preferably is low. The content of a volatile component preferably is 0.1% by weight or less. By the use of a resin substrate having a low content of a volatile component, a liquid crystal cell substrate capable of forming a transparent electrode film such as ITO (indium-tin mixed oxide) having superior adhesion with the resin substrate and low surface resistance value and further having small variations in the adhesion and the surface resistance value can be obtained.

The resin substrate preferably contains at least one resin selected from the group consisting of polyolefin resins, polysulfide resins, epoxy resins, phenol resins, diallyl phthalate resins, polyimide resins, polyphosphazene resins, polyarylate resins, polyethersulfone resins, polysulfone resins, polymethyl methacrylate resins, polyetherimide resins, polyamide resins, poly diallyl phthalate resins, and poly isobonyl methacrylate resins. Among the above-described resins, epoxy resins are particularly preferable from the viewpoint of heat resistance and transparency.

Examples of the epoxy resins include bisphenol type, novolac type, nitrogen-containing ring type, alicyclic type, aliphatic type, aromatic type, glycidyl ether type, biphenyl type, dicyclo type, ester type, and etherester type epoxy resins and modified type thereof. Examples of the bisphenol type epoxy resins include bisphenol A type, bisphenol F type, and bisphenol S type epoxy resins and those in which water is added. Examples of the novolac type epoxy resins include phenolnovolac type and cresol novolac type epoxy resins. Examples of the nitrogen-containing ring type epoxy resins include triglycidyl isocyanurate type and hydantoin type epoxy resins. Examples of the aromatic type epoxy resin include naphthalene type epoxy resins. These resins may be used alone or in a combination of two or more of them. Among the above-described various epoxy resins, the bisphenol A type, the alicyclic type, and the triglycidyl isocyanurate type epoxy resins particularly preferably are used from the viewpoint of preventing discoloration and the like.

Generally, the epoxy resin preferably is an epoxy resin having an epoxy equivalent weight in the range of 100 to 1000 and a softening point of 120° C. or less from the viewpoint of physical properties such as flexibility and strength of a resin substrate to be obtained. Further, the epoxy resin preferably is a two-pack type epoxy resin that is in the liquid state at the temperature at the time of applying or less and particularly, at the normal temperature, from the viewpoint of obtaining a solution containing an epoxy resin, which has superior applicability and developability at the time when the epoxy resin is formed into a sheet.

In the epoxy resin, a curing agent or a curing accelerator can be compounded as appropriate, and as necessary, various additives such as antiozonants, modifying agents, surfactants, dyes, pigments, discoloration inhibitors, and UV absorbers also can be compounded as appropriate.

The curing agent is not particularly limited, and any appropriate curing agents may be used alone or in a combination of two or more of them depending on the conditions such as a composition of an epoxy resin and a curing temperature. Examples of the curing agent include organic acid compounds, amine compounds, amide compounds, hydrazide compounds, imidazole compounds, imidazoline compounds, phenol compounds, urea compounds, polysulfide compounds, and acid anhydride compounds. Specifically, acid anhydride curing agents preferably are used from the viewpoint of improving heat resistance of an epoxy resin and inhibiting discoloration of the same.

Examples of the organic acid compounds include tetrahydrophthalic acid, methyltetrahydrophthalic acid, hexahydrophthalic acid, and methylhexahydrophthalic acid. Examples of the amine compounds include, ethylenediamine, propylene diamine, diethylenetriamine, triethylenetetramine, amine adducts thereof, meta phenylene diamine, diaminodiphenylmethane, and diaminodiphenylsulfone. Examples of the amide compounds include dicyandiamide and polyamides. Examples of hydrazide compounds include dihydrazides. Examples of the imidazole compounds include methylimidazole, 2-ethyl-4-methylimidazole, ethylimidazole, isopropylimidazole, 2,4-dimethylimidazole, phenylimidazole, undecylimidazole, heptadecylimidazole, and 2-phenyl-4-methylimidazol. Examples of the imidazoline compounds include methylimidazoline, 2-ethyl-4-methylimidazoline, ethylimidazoline, isopropylimidazoline, 2,4-dimethylimidazoline, phenylimidazoline, undecylimidazoline, heptadecylimidazoline, and 2-phenyl-4-methylimidazoline.

Examples of the acid anhydride compounds used as the curing agent by choice include phthalic anhydride, maleic anhydride, trimellitic anhydride, pyromellitic anhydride, nadic anhydride, glutaric anhydride, tetrahydrophthalic anhydride, methyltetrahydrophthalic anhydride, hexahydrophthalic anhydride, methylhexahydrophthalic anhydride, methylnadic anhydride, dodecenylsuccinic anhydride, dichlorosuccinic anhydride, benzophenonetetracarboxylic anhydride, and chlorendic anhydride.

Colorless or pale yellow acid anhydride curing agent having a molecular weight of about 140 to about 200 that is particularly typified by phthalic anhydride, tetrahydrophthalic anhydride, hexahydrophthalic anhydride, or methylhexahydrophthalic anhydride preferably is used.

With regard to a compounding ratio between the epoxy resin and the curing agent, in the case where acid anhydride is used as a curing agent, the curing agent preferably is compounded with the epoxy resin such that the acid anhydride equivalent weight becomes 0.5 to 1.5 with respect to 1 equivalent weight of an epoxy group of the epoxy resin, and more preferably is compounded with the epoxy resin such that the acid anhydride equivalent weight becomes 0.7 to 1.2 with respect to the same. There are tendencies that hue after curing an epoxy resin becomes worse in the case where the acid anhydride equivalent weight is less than 0.5, and humidity resistance is reduced in the case where the acid anhydride equivalent weight is more than 1.5. It is to be noted that, in the case where the other curing agents are used alone or in a combination of two or more of them, the compounding amount also follows the above-described equivalent ratio.

Examples of the curing accelerator include tertiary amines, imidazoles, quaternary ammonium salts, organometallic salts, phosphorus compounds, and urea compounds, and the tertiary amines, the imidazoles, and the phosphorus compounds particularly preferably are used. These curing accelerators may be used alone or in a combination of two or more of them.

The compounding amount of the curing accelerator can be decided as appropriate depending on an accelerated effect and the like, and is preferably 0.05 to 7 parts by weight with respect to 100 parts by weight of an epoxy resin, more preferably 0.2 to 3 parts by weight with respect to the same. A sufficient acceleration effect is not obtained in the case where the compounding amount of the curing accelerator is less than 0.05 parts by weight, and there is a possibility that a resin is discolored in the case where the compounding amount of the curing accelerator is more than 7 parts by weight.

Examples of the antiozonant include conventionally known antiozonants such as phenol compounds, amine compounds, organic sulfur compounds, and phosphine compounds.

Examples of the modifying agent include conventionally known modifying agents such as glycols, silicons, and alcohols.

The surfactant is compounded for the sake of forming a smooth surface and the like when the epoxy resin is formed into a sheet and subjected to a curing treatment in contact with the air. Examples of the surfactant include silicon surfactants, acrylic surfactants, and fluorine surfactants, and specifically, the silicon surfactants are preferable.

The formation of the resin substrate can be carried out by an appropriate technique such as, for example, a cast molding method, a flow-expanding method, an injection molding method, a roll-coat molding method, an extrusion molding method, a transfer molding method, or a reaction injection molding method (RIM).

The thickness of the resin substrate is preferably 1 mm or less, more preferably 0.8 mm or less, and particularly preferably in the range of 0.1 to 0.5 mm from the viewpoint of reducing the thickness, a lightweight property, strength, and preventing a change in shape. The resin substrate may be formed as a single layer or a laminate. The thickness of the resin substrate may be achieved by the laminate of two or three or more layers that are composed of resins identical to or different from each other.

The resin substrate may be provided with a transparent coat. The transparent coat preferably is a coat containing an organic polymer. Examples of the organic polymer include acrylic resins, silicon resins, polyurethane resins, epoxy resins, melamine resins, polyolefin resins, celluloses, polyvinyl alcohol resins, urea resins, nylon resins, and polycarbonate resins. These resins can be used alone or in a combination of two or more of them and can be further subjected to a three-dimensional crosslinking using various curing agents, crosslinking agents, and the like. Specifically, when the surface hardness of the resin substrate is caused to be increased, the transparent coat preferably is a resin that can be cured, and for example, acrylic resins, silicone resins, epoxy resins, polyurethane resins, and melamine resins preferably are used alone or as a complex thereof. When properties such as surface hardness, heat resistance, chemical resistance, and transparency are taken into consideration, the silicon resin preferably is used as an organic polymer, and more preferably, the organic polymer can be a polymer obtained from an organosilicon compound represented by the following general formula (I) or a hydrolysate thereof.

$$R^1_a R^2_b SiX_{4-a-b} \tag{I}$$

(in the general formula (I), $R^1$ is an organic group having a carbon number of 1 to 10, $R^2$ is a hydrocarbon group or a halogenated hydrocarbon group having a carbon number of 1 to 6, X is a hydrolyzable group, and a and b are 0 or 1.)

One or two or more organosilicon compounds can also be added.

In components for forming a coat composed mainly of a silicon resin, an acrylic resin, a polyurethane resin, an epoxy resin, a melamine resin, a polyolefin resin, cellulose, a polyvinyl alcohol resin, an urea resin, a nylon resin, a polycarbonate resin, or the like can be added besides the silicon resin. The resin is not particularly limited as long as transparency of the coat is not impaired, and the surface hardness of the same is in the satisfied range.

To reduce a cure temperature and further accelerate curing, an organosilicon compound preferably is used after being hydrolyzed. The organosilicon compound is hydrolyzed by adding pure water or an acidic aqueous solution such as hydrochloric acid, acetic acid, sulfuric acid, or the like to the organosilicon compound and stirring them. Further, the extent of hydrolysis can be easily controlled by controlling the amount of pure water or an acidic aqueous solution to be added. At the time of hydrolysing, adding pure water or an acidic aqueous solution having the number of moles equal to or more than and three times or less than that of a hydrolysable group contained in a compound represented by the above general formula (I) is preferable from the viewpoint of accelerating curing.

Since an alcohol is generated at the time of hydrolysing, the organosilicon compound can be hydrolyzed without a solvent. However, for the sake of hydrolysing further uniformly, it is possible to hydrolyze after mixing the organosilicon compound and a solvent. Further, it is also possible to use the organosilicon compound after removing an appropriate amount of alcohol and the like after the hydrolysis by heating or in vacuo depending on the purpose of using the transparent coat, and it is also possible to add an appropriate solvent after the removal.

Generally, the organic polymer preferably is applied as a liquid composition obtained by diluting the organic polymer with a volatile solvent. The volatile solvent is not particularly limited. However, the solvent is required not to impair the surface property of the resin substrate, and further, the solvent should be decided in view of stability of the organic polymer, wettability of the same to the base substrate, volatility, and the like. Further, it is possible to use not only a solvent but also a mixture of two or more solvents as the solvent. Examples of the solvent include alcohols, esters, ethers, ketones, halogenated hydrocarbons, aromatic hydrocarbons such as toluene and xylene, and aprotic polar solvents.

It is also preferable that inorganic fine particles and the like are added to the transparent coat for the sake of improving surface hardness, controlling a refractive index, and improving mechanical strength, thermal characteristics, and electrical conductivity. The inorganic fine particles are not particularly limited as long as transparency is not impaired in the state of being a coat. However, the inorganic fine particles are, for example, particularly preferably a sol in which the inorganic fine particles are dispersed to be colloidal from the viewpoint of improving operability and adding transparency. Examples thereof include a silica sol, a titania sol, a zirconia sol, a ceria sol, an antimony oxide sol, a magnesium fluoride sol, an ITO sol, and a tin oxide sol.

The content of the inorganic fine particles is not particularly limited. However, to cause the transparent coat to exert a further significant effect, the content of the inorganic fine particles preferably is 1% by weight or more and 80% by weight or less in the transparent coat. That is, the clear effect caused by addition is not recognized in the case where the content is less than 1% by weight, and there are cases to generate problems of defect in adhesiveness with the resin substrate, crack of a coat itself, and reducing impact resistance in the case where the content is more than 80% by weight.

The particle sizes of the inorganic fine particles are not particularly limited, and are generally in the range of 1 to 200 nm, preferably in the range of 5 to 100 nm, and further preferably in the range of 20 to 80 nm. There are tendencies that transparency of a coat to be obtained is poor, and the coat is further clouded in the case where the fine particles having an average particle size of more than 200 nm. Further, to improve dispersibility of the inorganic fine particles, various fine-particle surface treatments may be conducted to them or various surfactants or amines may be added to them.

A liquid composition to be used at the time of forming the transparent coat can be used in combination with various curing agents for the sake of making accelerating curing and curing at a low temperature possible. As the curing agent, various epoxy resin curing agents, various organosilicon resin curing agents, or the like are used.

Examples of the curing agent include various organic acids, acid anhydrides thereof, nitrogen-containing organic compounds, various metal complex compounds, metal alkoxides, various salts such as organic carboxylates and carbonates of alkali metals, and radical polymerization initiators such as peroxides and azobisisobutyronitriles. The curing agents can be used by mixing two or more of them. Among the curing agents, an aluminum chelate compound specifically is useful from the viewpoint of stability of a liquid composition, no coloring of a coat after coating, and the like.

It is possible to add various surfactants to the liquid composition to be used at the time of forming the transparent coat for the sake of improving a procedure at the time of applying and smoothness of the transparent coat and reducing a frictional coefficient of a surface of the coat. As the surfactant, specifically, a block copolymer or a graft copolymer of dimethylpolysiloxane and alkylene oxide is useful, and further, a fluorine surfactant, or the like is useful.

It is also possible to add inorganic materials such as metal alkoxides represented by the following general formula (II), chelate compounds and/or hydrolysates thereof, and the like to the liquid composition to be used at the time of forming the transparent coat in the range where a coat performance, transparency, and the like are not significantly reduced. By the use of a liquid composition in combination with these additives, physical properties such as adhesion with a base substrate, chemical resistance, surface hardness, durability, and the like of the transparent coat can be improved.

$$M(OR)m \quad\quad (II)$$

(In the formula (II), R is an alkyl group, an acyl group, or an alkoxyalkyl group, and m is the same value as the charge number of a metal M. M is silicon, titanium, zircon, antimony, tantalum, germanium, aluminum, or the like.)

It is also possible to add a UV absorber for the sake of further improving weather resistance, and to add an antioxidant for the sake of improving heat deterioration resistance.

The transparent coat is obtained by curing the liquid composition, and the curing preferably is carried out by a heat treatment. The heating temperature is selected as appropriate considering the composition of the liquid composition, heat resistance of the resin that forms the resin substrate, and preferably is in the range of 50° C. to 250° C.

As the means for applying the liquid composition on the resin substrate, an applying method that is conventionally carried out such as brush coating, dip coating, roller coating, spray coating, spin coating, or flow coating can be used easily.

At the time of applying the liquid composition, carrying out various pretreatments to the resin substrate for the sake of improving cleanness, adhesion, water resistance, and the like also is a effective means. The method to be used particularly preferably can be an activated gas treatment, a chemical treatment, an ultraviolet treatment, or the like.

The activated gas treatment is a treatment by ions, electrons, or excited gas that is generated under ordinary pressure or reduced pressure. The method for causing these activated gases to be generated can be, for example, a method by corona discharge or high voltage discharge by direct current under reduced pressure, low frequency, high frequency, or microwave. Specifically, the treatment by low-temperature plasma obtained by high-frequency discharge under reduced pressure preferably is used from the viewpoint of reproducibility, productivity, and the like.

The gas used in the activated gas treatment is not particularly limited, and examples thereof include oxygen, nitrogen, hydrogen, carbon dioxide, sulfur dioxide, helium, neon, argon, FREON (registered trademark), water vapor, ammonia, carbon monoxide, chlorine, nitric oxide, and nitrogen dioxide. These gases can be used not only alone but also by mixing two or more of them. Among these gases, a preferred gas is a gas containing oxygen and may be a gas that is present in the natural world such as air. More preferably, a pure oxygen gas is effective for improving adhesion. Further, it is possible to increase a temperature of the resin substrate at the time of the treatment for the sake of improving adhesion.

On the other hand, examples of the chemical treatment include alkali treatments by caustic soda and the like, acid treatments by hydrochloric acid, sulfuric acid, potassium permanganate, potassium dichromate, and the like, and organic solvent treatments.

It is sufficiently possible to conduct the pretreatment by using the above-described treatments in combination in a continuous manner or a stepwise manner.

The thickness of the transparent coat is not particularly limited, and is preferably in the range of 0.1 to 50 μm, particularly preferably in the range of 0.3 to 10 μm from the viewpoint of maintenance of adhesive strength, hardness, and the like. In the formation of the transparent coat, the liquid composition is used after being diluted with various solvents for the sake of improving operability and controlling the thickness of the coat. As the diluent solvent, various solvents such as water, alcohol, ester, ether, halogenated hydrocarbon, dimethylformamide, dimethyl sulfoxide, and the like can be used depending on the purpose of improving operability and controlling the thickness of the coat, and mixed solvents also can be used as necessary. From the viewpoint of dispersibility and the like of the inorganic fine particles and the like, polar solvents such as water, alcohols, dimethylformamide, ethylene glycol, diethylene glycol, triethylene glycol, benzyl alcohol, phenethyl alcohol, and phenyl cellosolve preferably are used.

In the present invention, as a material for forming an optical compensation layer, both of a liquid-crystalline material and a non-liquid crystalline material can be used. However, the non-liquid crystalline material, especially, a non-liquid crystalline polymer is particularly preferable.

The optical compensation layer may be laminated directly on the resin substrate, or may be laminated on the same through an adhesive layer or a pressure-sensitive adhesive layer. When the optical compensation layer is laminated through an adhesive layer or a pressure-sensitive adhesive layer, it is possible to form the optical compensation layer also by the method in which an optical compensation layer is temporary formed on the base substrate that is different from the resin substrate and thereafter is transferred to the resin substrate, as will be mentioned later.

When a liquid crystalline material containing a chiral agent is used as the material for forming an optical compensation layer, the optical compensation layer exhibits negative uniaxiality satisfying nx=ny>nz. The chiral agent is a compound having a function to align the liquid crystalline material so as to have a cholesteric structure. Conventionally known compounds such as, for example, those disclosed in JP 2003-287623 A can be used as the chiral agent and the liquid crystalline material. An optical compensation layer can be obtained by applying a mixed solution containing the liquid crystalline material and the chiral agent on an aligned base substrate such as a polyimide substrate subjected to an alignment treatment such as a rubbing treatment and the like, and thereafter subjecting the aligned base substrate to a polymerization treatment, a crosslinking treatment, or the like so as to fix the alignment of the liquid crystalline material.

Since the optical compensation layer of the present invention has superior heat resistance, chemical resistance, transparency, and rigidity, the optical compensation layer preferably is formed of at least one non-liquid crystalline polymer selected from the group consisting of polyamides, polyimides, polyesters, polyetherketones, polyamideimides, and polyesterimides such as described in JP 2004-46065 A. Among these non-liquid crystalline polymers, polyimides are particularly preferable because of having high transparency, alignment, and stretchability.

These non-liquid crystalline polymers exhibit negative uniaxiality satisfying nx=ny>nz by only applying and curing, and there are advantages that it becomes possible to cause the non-liquid crystalline polymer to exhibit biaxiality satisfying nx>ny>nz, and designing an optical system becomes easy by further conducting a stretching treatment or a shrinking treatment. There is no need to subject a base substrate to an alignment treatment when an optical compensation layer is formed of the non-liquid crystalline polymer. Thus, it is possible to form an optical compensation layer by a direct method in which the non-liquid crystalline polymer is applied directly to the resin substrate. When the optical compensation layer caused to exhibit biaxiality by conducting a stretching treatment or a shrinking treatment is formed, it is possible that the optical compensation layer is caused to exhibit biaxiality by conducting the treatment by applying a material for forming an optical compensation layer to a base substrate capable of stretching or shrinking, and the optical compensation layer is laminated on a resin substrate by a transcription method.

A wavelength dispersion of the non-liquid crystalline polymer type optical compensation layer has a positive dispersion characteristic, which is similar to that of a vertical alignment (VA) mode liquid crystal cell. Therefore, by the use of the liquid crystal cell substrate of the present invention having the non-liquid crystalline polymer type optical compensation layer in combination with the VA mode liquid crystal cell, it becomes possible to obtain a liquid crystal panel and a liquid crystal display having superior display characteristics. The liquid crystal cell substrate of the present invention in the case where polyimide is used as the non-liquid crystalline polymer is compatible specifically with the VA mode liquid crystal cell. Thus, a liquid crystal panel and a liquid crystal display having a favorable display characteristic can be obtained. The liquid crystal cell substrate obtained by combining the resin substrate using the epoxy resin and the optical compensation layer using polyimide has superior heat resistance and transparency, and also is compatible with the VA mode liquid crystal cell. Therefore, by the use of the liquid crystal cell substrate, a liquid crystal panel and a liquid crystal display each having a particularly favorable display characteristic can be obtained. In the present invention, a positive dispersion characteristic means that a wavelength dispersion Wd of an optical compensation layer has a characteristic satisfying the following formula (III), for example.

$$Wd:Re(380)/Re(550)>1 \quad \text{(III)}$$

$Re(\lambda)$: in-plane retardation value of a layer represented by the following formula (IV) at a wavelength $(\lambda)$ $$Re(\lambda)=(nx-ny)\times d \quad \text{(IV)}$$

The molecular weight of the polymer is not particularly limited, and the weight-average molecular weight (Mw) of the polymer is, for example, preferably in the range of 1,000 to 1,000,000, and more preferably in the range of 2,000 to 500,000. The weight-average molecular weight can be measured by the gel permeation chromatography (GPC) method using polyethylene oxide as a standard sample and DMF (N,N-dimethylformamide) as a solvent.

As mentioned above, the optical compensation layer can be formed on the resin substrate by forming a film (hereinafter, referred to as "coating film") by applying the non-liquid crystalline polymer on the resin substrate and solidifying the non-liquid crystalline polymer in the coating film. The non-liquid crystalline polymer such as polyimide has an optical characteristic satisfying nx=ny>nz regardless of the presence or absence of alignment of the resin substrate because of the property of the non-liquid crystalline polymer. Therefore, an optical compensation layer having optical uniaxiality, i.e., having retardance in only a thickness direction can be formed.

The method for applying the non-liquid crystalline polymer on the resin substrate is not particularly limited, and examples thereof include a method for applying a non-liquid crystalline polymer such as mentioned above by heat-melting and a method for applying a polymer solution obtained by solving the non-liquid crystalline polymer in a solvent. Among the methods, the method for applying a polymer solution is preferable because of its superior operability.

The concentration of the polymer in the polymer solution is not particularly limited. However, for example, because the viscosity with which applying becomes easy can be obtained, the concentration of the non-liquid crystalline polymer preferably is in the range of 5 to 50 parts by weight, more preferably in the range of 10 to 40 parts by weight, with respect to 100 parts by weight of a solvent.

The solvent of the polymer solution is not particularly limited as long as the solvent can solve the non-liquid crystalline polymer and can be decided as appropriate depending on the type of the non-liquid crystalline polymer. Examples of the solvent include: halogenated hydrocarbons such as chloroform, dichloromethane, tetrachloromethane, dichloroethane, tetrachloroethane, trichloroethylene, tetrachloroethylene, chlorobenzene, and ortho-dichlorobenzene; phenols such as phenol and parachlorophenol; aromatic hydrocarbons such as benzene, toluene, xylene, methoxybenzene, and 1,2-dimethoxybenzene; ketone solvents such as acetone, methyl ethyl ketone (MEK), methyl isobutyl ketone (MIBK), cyclohexanone, cyclopentanone, 2-pyrrolidone, and N-methyl-2-pyrrolidone; ester solvents such as ethyl acetate and butyl acetate; alcohols such as t-butyl alcohol, glycerin, ethylene glycol, triethylene glycol, ethylene glycol monomethyl ether, diethylene glycol dimethyl ether, propylene glycol, dipropylene glycol, and 2-methyl-2,4-pentanediol; amide solvents such as dimethylformamide and dimethylacetamide; nitrile solvents such as acetonitrile and butyronitrile; ether solvents such as diethyl ether, dibutyl ether, and tetrahydrofuran; carbon disulfide; ethyl cellosolve; and butyl cellosolve. These solvents may be used alone or in a combination of two or more of them.

The polymer solution may further contain any appropriate additive. Examples of the additive include plasticizers, thermostabilizers, light stabilizers, lubricants, antioxidants, UV absorbers, flame retardants, colorants, antistatic agents, compatibilizers, crosslinking agents, thickeners, and metals.

The polymer solution may contains other different resins in the range where an alignment property or the like of the non-liquid crystalline polymer is not significantly reduced, for example. Examples of the resin include various general-purpose resins, engineering plastics, thermoplastic resins, and thermosetting resins.

Examples of the general-purpose resin include polyethylenes (PEs), polypropylenes (PPs), polystyrenes (PSs), polymethyl methacrylates (PMMAs), ABS resins, and AS resins. Examples of the engineering plastics include polyacetates (POMs), polycarbonates (PCs), polyamides (PAs: nylons), polyethylene terephthalates (PETs), and polybutylene terephthalates (PBTs). Examples of the thermoplastic resin include polyphenylsulfides (PPSs), polyethersulfones (PESs), polyketones (PKs), polyimides (PIs), poly cyclohexanedimethanol terephthalates (PCTs), polyarylates (PARs), and liquid crystalline polymers (LCPs). Examples of the thermosetting resin include epoxy resins and phenol novolac resins.

As above, when the other resins and the like are compounded in the polymer solution, the compounding amount is, for example, in the range of 0% to 50% by weight, preferably in the range of 0% to 30% by weight, with respect to the polymer material, for example.

Examples of the method for applying the polymer solution include a spin coating method, a roller coating method, a flow coating method, a printing method, a dip coating method, a flow-expanding method, a bar coating method, and gravure printing method. It is to be noted that, at the time of applying, a method for superimposing a polymer layer can be employed as necessary.

Solidification of the non-liquid crystalline polymer forming a coating film can be carried out by, for example, drying the coating film. The drying method is not particularly limited, and can be, for example, air drying or heat drying. The drying conditions can be, for example, decided as appropriate depending on the types of the non-liquid crystalline polymer and the solvent and the like. The drying temperature is, for example in the range of 40° C. to 300° C., preferably in the range of 50° C. to 250° C., and more preferably in the range of 60° C. to 200° C. It is to be noted that the drying of the coating film may be carried out at a constant temperature or by gradually increasing or decreasing the temperature. The drying time also is not particularly limited, and is, for example, in the range of 10 seconds to 30 minutes, preferably in the range of 30 seconds to 25 minutes, and more preferably in the range of 1 to 20 minutes.

A solvent of the polymer solution remaining in the optical compensation layer may cause optical characteristics of the resin substrate to change over time in proportion to the amount of the remaining solvent. Therefore, the remaining amount is, for example, preferably 5% or less, more preferably 2% or less, and yet more preferably 0.2% or less.

An optical compensation layer having optical biaxiality, i.e., a refractive index distribution satisfying nx>ny>nz, can be formed also by the use of a base substrate that is different from the resin substrate in the case of forming the coating film. For example, a coating film is formed by directly applying the non-liquid crystalline polymer on a base substrate that is shrinkable in one direction within a plane in the same manner as mentioned above, and thereafter, the base substrate is shrunk. As the base substrate is shrunk, the coating film on the base substrate also is shrunk in the plane direction. Therefore, the differences among refractive indices are generated within a plane in the coating film, whereby optical biaxiality (nx>ny>nz) is exhibited. The optical compensation layer having optical biaxiality is formed by solidifying the non-liquid crystalline polymer forming the coating film.

To cause the base substrate to be shrinkable in one direction within a plane, it is preferable that the base substrate is previously stretched in one direction within a plane, for example. By previously stretching the base substrate as above, shrinkage force is generated in the direction opposite to the stretching direction. Utilizing the difference in shrinkage within a plane of this base substrate, the non-liquid crystalline polymer forming the coating film is caused to have the differences among refractive indices within a plane. The thickness of the base substrate before the stretching is not particularly limited, and is, for example, in the range of 10 to 200 µm, preferably in the range of 20 to 150 µm, and more preferably in the range of 30 to 100 µm. The stretch ratio is not particularly limited.

The base substrate can be shrunk by forming a coating film on the base substrate in the same manner as mentioned above and thereafter heat-treating the base substrate. The conditions of the heat treatment are not particularly limited, and can be, for example, decided as appropriate depending on the type of the material of the base substrate. The heating temperature is, for example, in the range of 25° C. to 300° C., preferably in the range of 50° C. to 200° C., and more preferably in the range of 60° C. to 180° C. The extent of the shrinkage is not particularly limited. The shrink ratio can be, for example, more than 0% and 10% or less, assuming that the length of the base substrate before shrinking is 100%.

On the other hand, an optical compensation layer having optical biaxiality, i.e., satisfying nx>ny>nz, can be formed on a base substrate and can be transferred on the resin substrate also by forming a coating film on a base substrate that is different from the resin substrate in the same manner as mentioned above and stretching the base substrate and the coating film together. According to this method, by stretching a laminate of the base substrate and the coating film together in one direction within a plane, the differences among refractive indices are generated within a plane of the coating film, and the optical compensation layer is caused to have optical biaxiality (nx>ny>nz).

The method for stretching the laminate of the base substrate and the coating film is not particularly limited, and examples thereof include free-end longitudinal stretching that performs uniaxial stretching in the longitudinal direction, fixed-end transverse stretching that performs uniaxial stretching in the width direction in the state where a film is fixed in the longitudinal direction, sequential or simultaneous biaxial stretching that performs stretching in both of the longitudinal direction and the width direction.

The stretching of the laminate is carried out by stretching both of the base substrate and the coating film. However, stretching only the base substrate is preferred for the following reason. When the base substrate only is stretched, the coating film on the base substrate is indirectly stretched by the tension generated in the base substrate by this stretching. Further, since uniform stretching generally is achieved by the stretching of a single layer rather than by the stretching of a laminate, the coating film on the base substrate also can be stretched uniformly by stretching only the base substrate uniformly as mentioned above.

The stretching conditions are not particularly limited, and can be decided as appropriate depending on, for example, the types of the base substrate and the non-liquid crystalline polymer and the like. The heating temperature at the time of stretching can be decided as appropriate depending on, for example, the types of the base substrate and the non-liquid crystalline polymer, their glass transition temperatures (Tg), the type of additives, and the like. The temperature is, for example, in the range of 80° C. to 250° C., more preferably in the range of 120° C. to 220° C., and yet more preferably in the range of 140° C. to 200° C. Particularly preferably, the temperature is around Tg of the material of the base substrate or the Tg or higher.

As above, by forming the coating film on a base substrate that is different from the resin substrate, shrinking or stretching the base substrate and the coating film together, thereafter attaching this to the resin substrate through a pressure-sensitive adhesive layer or an adhesive layer, and then removing the base substrate, an optical compensation layer having a refractive index distribution (optical biaxiality) satisfying nx>ny>nz can be formed on the resin substrate by the transferring.

The pressure-sensitive adhesive or the adhesive is not particularly limited, and for example, conventionally known objects such as transparent pressure-sensitive adhesives or adhesives such as acrylic, silicon, polyester, polyurethane, polyether, rubber pressure-sensitive adhesives or adhesives can be used. Among them, from the viewpoint of preventing a change in optical characteristic of the resin substrate, the one with which the process at a high temperature is not required at the time of curing and drying is preferable.

The thickness of the pressure-sensitive adhesive layer or the adhesive layer can be set as appropriate depending on the purpose of the transcription, adhesion strength, and the like. The thickness of the pressure-sensitive adhesive layer or the adhesive layer is preferably in the range of 0.1 to 5 µm, more preferably in the range of 0.15 to 4 µm, and yet more preferably in the range of 0.2 to 3 µm.

The indentation hardness (Microhardness) of the pressure-sensitive adhesive layer or the adhesive layer is preferably in the range of 0.1 to 0.5 GPa, more preferably in the range of 0.2 to 0.5 GPa, and particularly preferably in the range of 0.2 to 0.4 GPa. A polyurethane pressure-sensitive adhesive can be used preferably. When the hardness is in the above-described range, operability at the time of transferring an optical compensation layer is favorable. It is to be noted that since it is known that there is a correlation between the indentation hardness and the Vickers hardness, the indentation hardness can be converted to the Vickers hardness.

The indentation hardness can be determined from an indentation depth and an indentation load with a thin-film hardness meter (product name, MH4000 and product name, MHA-400, and the like) manufactured by NEC corporation.

The optical compensation layer may be a single layer or may be a laminate of a plurality of layers. The thickness of the optical compensation layer is, for example, preferably in the range of 0.5 to 15 µm, more preferably in the range of 0.5 to 10 µm.

The transmittance of the optical compensation layer at the wavelength of 550 nm is preferably 90% or more, more preferably 92% or more.

An easy adhesion treatment preferably is conducted to the surface on a side of the resin substrate on which the optical compensation layer is formed. The easy adhesion treatment preferably is a treatment in which a resin material is applied. As the resin material, a silicon resin, a urethane resin, or an acrylic resin is preferable, for example. By conducting the easy adhesion treatment, an easy adhesion layer is formed on the surface on which the optical compensation layer is formed. The thickness of the easy adhesion layer is preferably in the range of 5 to 100 nm, and more preferably in the range of 10 to 80 nm.

A color filter also can be formed in the liquid crystal cell substrate of the present invention. The color filter preferably is formed on the optical compensation layer. It is also preferable to form an under layer between the optical compensation layer and the color filter for the sake of improving adhesion and the like.

The color filter is configured of a red region, a green region, a blue region, and a black matrix, and these respective ranges are formed by applying a coloring composition to a transparent substrate on a visibility side. The coloring composition contains a dye carrier containing a transparent resin and a precursor thereof and dye, and preferably further contains a photopolymerization initiator.

A transmittance of the transparent resin in an entire wavelength range of the visible light range (for example, 400 to 700 nm) is preferably 80% or more, and more preferably 85% or more. Examples of the transparent resin include thermoplastic resins, thermosetting resins, and photosensitive resins. A precursor of the transparent resin can be, for example, monomer, oligomer, or the like that generates a transparent resin by curing by radiation. These may be used alone or in a combination of two or more of them.

Examples of the thermoplastic resin include butyral resins, styrene-maleic acid copolymers, chlorinated polyethylenes, chlorinated polypropylenes, polyvinyl chlorides, vinyl chloride-vinyl acetate copolymers, polyvinyl acetates, polyurethane resins, polyester resins, acrylic resins, alkyd resins, polystyrene resins, polyamide resins, rubber resins, cyclic rubber resins, celluloses, polyethylenes, polybutadienes, and polyimide resins.

Examples of the thermosetting resin include epoxy resins, benzoguanamine resins, rosin modified maleic acid resins, rosin modified fumaric acid resins, melamine resins, urea resins, and phenol resins.

As the photosensitive resin, for example, a resin in which a photocrosslinking group such as an acryloyl group, a metacryloyl group, or a styryl group is introduced to a liner polymer having a reactive substituent such as a hydroxy group, a carboxyl group, or an amino group is used, the resin being obtained by causing the liner polymer to react with an acryl compound, a methacryl compound, or a cinnamic acid that has a reactive substituent such as an isocyanate group, an aldehyde group, or an epoxy group. Further, a resin obtained by half-esterifying a liner polymer containing an acid anhydride such as a styrene-maleic acid anhydride copolymer or an α-olefin-maleic acid anhydride copolymer with an acryl compound or a methacryl compound having a hydroxy group such as hydroxyalkyl acrylate or hydroxyalkyl methacrylate also is used.

Examples of monomer and oligomer of precursors include acrylic acid esters, methacrylic acid esters, acrylic acid, methacrylic acid, styrene, vinyl acetate, hydroxyethyl vinyl ether, ethylene glycol divinyl ether, pentaerythritol trivinyl ether, acrylamide, methacrylamide, N-hydroxymethyl acrylamide, N-hydroxymethyl methacrylamide, N-vinyl formamide, and acrylonitrile. These may be used alone or in a combination of two or more of them. Examples of the acrylic acid ester include methyl acrylate, ethyl acrylate, 2-hydroxyethyl acrylate, 2-hydroxypropyl acrylate, cyclohexyl acrylate, β-carboxyethyl acrylate, polyethylene glycol diacrylate, 1,6-hexanediol diacrylate, triethylene glycol diacrylate, tripropylene glycol diacrylate, trimethylolpropane triacrylate, pentaerythritol triacrylate, 1,6-hexanediol diglycidyl ether diacrylate, bisphenol A diglycidyl ether diacrylate, neopentyl glycol diglycidyl ether diacrylate, dipentaerythritol hexaacrylate, tricyclodecanyl acrylate, ester acrylate, acrylic acid ester of methylol melamine, epoxy acrylate, and urethane acrylate. Examples of the methacrylic acid ester include methyl methacrylate, ethyl methacrylate, 2-hydroxyethyl methacrylate, 2-hydroxypropyl methacrylate, cyclohexyl methacrylate, β-carboxyethyl methacrylate, polyethylene glycol dimethacrylate, 1,6-hexanediol dimethacrylate, triethylene glycol dimethacrylate, tripropylene glycol dimethacrylate, trimethylolpropane trimethacrylate, pentaerythritol trimethacrylate, 1,6-hexanediol diglycidyl ether dimethacrylate, bisphenol A diglycidyl ether dimethacrylate, neopentyl glycol diglycidyl ether dimethacrylate, dipentaerythritol hexamethacrylate, tricyclodecanyl methacrylate, methacrylic acid ester of methylol melamine, and epoxy methacrylate.

As the dye, an organic pigment or an inorganic pigment can be used. These pigments may be used alone or in a combination of two or more of them. Among the pigments, the pigment having high color developability and heat resistance and specifically having high resistance to thermal degradation is preferable, and generally, the organic pigment is used.

Hereinafter, specific examples of the organic pigment that can be used for the coloring composition will be shown by Color Index Constitution Numbers.

As the coloring composition having red photosensitivity for forming the red region, red pigments such as, for example, C.I. Pigment Red Nos. 1, 2, 3, 7, 9, 14, 41, 48:1, 48:2, 48:3, 48:4, 81:1, 81:2, 81:3, 97, 122, 123, 146, 149, 168, 177, 178, 179, 180, 184, 185, 187, 192, 200, 202, 208, 210, 215, 216, 217, 220, 223, 224, 226, 227, 228, 240, 246, 254, 255, 264, 272, and 279 can be used. These coloring compositions may be used alone or in a combination of two or more of them. As the coloring composition having red photosensitivity, a yellow pigment, an orange pigment, and the like can be used in combination with the red pigment, for example.

As the coloring composition having green photosensitivity for forming the green region, green pigments such as, for example, C.I. Pigment Green Nos. 7, 10, 36, and 37 can be used. These coloring compositions may be used alone or in a combination of two or more of them. As the coloring composition having green photosensitivity, a yellow pigment and the like can be used in combination with the green pigment, for example.

As the coloring composition having blue photosensitivity for forming the blue region, blue pigments such as, for example, C.I. Pigment Blue Nos. 15, 15:1, 15:2, 15:3, 15:4, 15:6, 16, 22, 60, 64, and 80 can be used. These blue pigments may be used alone or in a combination of two or more of them. As the coloring composition having blue photosensitivity a violet pigment such as C.I. Pigment Violet No. 1, 19, 23, 27, 29, 30, 32, 37, 40, 42, or 50 can be used in a combination with the blue pigment, for example. These violet pigments may be used alone or in a combination of two or more of them.

As the coloring composition having black photosensitivity for forming the black matrix, black pigments such as, for example, carbon black, aniline black, anthraquinone black pigment, and perylene black pigment can be used. Examples thereof include C.I. Pigment Black Nos. 1, 6, 7, 12, 20, and 31. These coloring compositions may be used alone or in a combination of two or more of them. As the coloring composition having black photosensitivity, a mixture of a red pigment, a blue pigment, and a green pigment also can be used, for example. As the black pigment, carbon black is preferable from the viewpoint of a cost and imperviousness to light. The carbon black may be subjected to a surface treatment with resin and the like. Further, to control color, a blue pigment, a violet pigment, and the like can be used in combination with the above-described coloring composition as the coloring composition having black photosensitivity, for example.

From the viewpoint of the shape of the black matrix, the specific surface area of the carbon black determined by a BET method preferably is in the range of 50 to 200 m$^2$/g. By setting the specific surface area to be 50 m$^2$/g or more, it can be prevented that the black matrix is deformed, for example. By setting the specific surface area to be 200 m$^2$/g or less, transient absorption of a dispersion aid to carbon black can be prevented, and physical properties can be caused to be exhibited by compounding a small amount of dispersion aid, for example.

Further, from the viewpoint of sensitivity, a dibutyl phthalate (hereinafter, referred to as "DBP") oil absorption of the carbon black preferably is 120 cm$^3$/100 g or less, and the smaller the oil absorption, the more preferable.

An average primary particle size of the carbon black preferably is in the range of 20 to 50 nm. By setting the average primary particle size to be 20 nm or more, it becomes possible to disperse carbon black at a high concentration, and a photosensitive black composition having favorable longitudinal stability can be obtained, for example. By setting the average primary particle size to be 50 nm or less, it can be prevented that the black matrix is deformed, for example.

Examples of the inorganic pigment include red iron oxide (red iron oxide (III)), cadmium red, ultramarine, iron blue, chromium oxide green, cobalt green, umber, titanium black, metal-oxide powder such as synthesized iron black, metal sulfide powder, and metal power. These inorganic pigments may be used alone or in a combination of two or more of them. The inorganic pigment is used in combination with an organic pigment to maintain favorable applicability, sensitivity, developability, and the like, while balancing chroma and lightness with each other. A dye and the like can be contained in the coloring composition for toning in the range in which heat resistance is not reduced.

A solvent can be contained in each of the coloring compositions. This is for easily forming the respective ranges and the black matrix by dispersing sufficiently a dye in a dye carrier and applying the coloring composition on a transparent substrate so that the dried film has a predetermined thickness. Examples of the solvent include cyclohexanone, ethyl cellosolve acetate, butyl cellosolve acetate, 1-methoxy-2-propyl acetate, diethylene glycol dimethyl ether, ethylbenzene, ethylene glycol diethyl ether, xylene, ethyl cellosolve, methyl-n-amyl ketone, propylene glycol monomethyl ether, toluene, methyl ethyl ketone, ethyl acetate, methanol, ethanol, isopropyl alcohol, butanol, isobutyl ketone, and petroleum solvents. These solvents may be used alone or in a combination of two or more of them.

The coloring composition can be prepared by dispersing finely a dye or a dye composition containing two or more of dyes preferably together with a photopolymerization initiator in a dye carrier and a solvent by a dispersion means such as a three-roll mill, a two-roll mill, a sand mill, a kneader, or an attritor, for example. When the photosensitive coloring composition contains two or more of dyes, the coloring composition can be prepared also by mixing those obtained by dispersing individually the respective dyes in the respective dye carriers and solvents, for example. When the dye is dispersed in a dye carrier and a solvent, a dispersion aid such as a resin-type pigment dispersant, a surfactant, or a dye derivative can be caused to be contained optionally. The dispersion aid has superior dispersibility of a pigment and a big effect of preventing reaggregation of the pigment after dispersion. Therefore, when a photosensitive coloring composition obtained by dispersing a pigment in a dye carrier and a solvent using the dispersion aid is used, a color filter having a superior transparency is obtained.

The resin-type pigment dispersant is the one having a pigment affinity site that has a property to adsorb to a pigment, a site that is compatible with a dye carrier, and a function to stabilize dispersion of a pigment in a dye carrier by adsorbing to the pigment.

As the resin-type pigment dispersant, polycarboxylic acid ester, unsaturated polyamide, polycarboxylic acid, polycarboxylic acid (part) amine salt, polycarboxylic acid ammonium salt, polycarboxylic acid alkylamine salt, polycyclohexane, long-chain polyaminoamide phosphate, hydroxy group-containing polycarboxylic ester, a modified product thereof, or the like can be used, for example. Examples of the polycarboxilic acid ester include polyurethanes and polyacrylates. As the resin-type pigment dispersant, an oil dispersant such as amide formed by a reaction between poly (lower alkylene imine) and polyester having a free carboxyl group or a salt thereof can be used, for example. As the resin-type pigment dispersant, a water-soluble resin, a water-soluble polymer compound, a polyester resin, a modified polyacrylate resin, an ethylene oxide or propylene oxide adduct resin, a phosphoester resin, or the like also can be used, for example. Examples of the water-soluble resin and the water-soluble polymer compound include acrylic acid-styrene copolymers, methacrylic acid-styrene copolymers, acrylic acid-methacrylic acid ester copolymers, styrene-maleic acid copolymers, polyvinyl alcohols, and polyvinyl pyrrolidones. These resin-type pigment dispersants may be used alone or in a combination of two or more of them.

As the surfactant, an anionic surfactant, a nonionic surfactant, a cationic surfactant, an amphoteric surfactant, or the like can be used, for example. Examples of the anionic surfactant include polyoxyethylene alkyl ether sulfate salts, dodecylbenzene sodium sulfonate, alkali salts of styrene-acrylic acid copolymers, sodium stearate, alkyl naphthalene sodium sulfonate, alkyl diphenyl ether sodium disulfonate, monoethanolamine lauryl sulfate, triethanolamine lauryl sulfate, ammonium lauryl sulfate, monoethanolamine stearate, sodium lauryl sulfate, monoethanolamines of styrene-acrylic acid copolymers, and polyoxyethylene alkyl ether phosphate ester. Examples of the nonionic surfactant include polyoxyethylene oleyl ethers, polyoxyethylene lauryl ethers, polyoxyethylene nonylphenyl ethers, polyoxyethylene alkyl ether phosphate esters, polyoxyethylene sorbitan monostearates, and polyethylene glycol monolaurates. Examples of the cationic surfactant include alkyl quaternary ammonium salts and ethylene oxide adduct thereof. Examples of the amphoteric surfactant include alkyl betaines such as alkyl dimethyl amino acetic acid betaine and alkyl imidazolines. These surfactants may be used alone or in a combination of two or more of them.

The dye derivative is, for example, a compound obtained by introducing a substituent to an organic dye. Examples of the organic dye include pale yellow aromatic polycyclic compounds of naphthalene, anthraquinone, and the like, which are not generally called dyes. As the dye derivative, the one described in JP 63 (1988)-305173A, JP 57 (1982)-15620 B, JP 59 (1984)-40172 B, JP 63 (1988)17102 B, JP 5 (1993)-9469 B, or the like can be used, for example. These dye derivatives may be used alone or in a combination of two or more of them.

Examples of the photopolymerization initiator include acetophenone compounds, benzoin compounds, benzophenone compounds, thioxanthone compounds, triazine compounds, oxime ester compounds, phosphine compounds, quinine compounds, borate compounds, carbazole compounds, imidazole compounds, and titanocene compounds. Examples of the acetophenone compound include 4-phenoxy dichloroacetophenone, 4-t-butyl-dichloroacetophenone, diethoxyacetophenone, 1-(4-isopropylphenyl)-2-hydroxy-2-methylpropane-1-on, 1-hydroxycyclohexyl phenyl ketone, and 2-benzyl-2-dimethylamino-1-(4-morpholinophenyl)-butane-1-on. Examples of the benzoin compound include benzoin, benzoin methyl ether, benzoin ethyl ether, benzoin isopropyl ether, and benzyl dimethyl ketal. Examples of the benzophenone compound include benzophenone, benzoyl benzoic acid, benzoyl benzoic acid methyl, 4-phenyl benzophenone, hydroxybenzophenone, acrylated benzophenone, 4-benzoyl-4'-methyl diphenyl sulfide, and 3,3',4,4'-tetra(t-butylperoxycarbonyl)benzophenone. Examples of the thioxanthone compound include thioxanthone, 2-chlorthioxanthone, 2-methyl thioxanthone, isopropylthioxanthone, 2,4-diisopropyl thioxanthone, and 2,4-diethyl thioxanthone. Examples of the triazine compound include 2,4,6-trichloros-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxy-naphtho-1-yl)-4,6-bis(trichloromethyl)-s-triazine, 2,4-trichloromethyl-(piperonyl)-6-triazine, and 2,4-trichloromethyl(4'-methoxystyryl)-6-triazine. Examples of the oxime ester compound include 1,2-octanedione, 1-[4-(phenylthio)phenyl]-,2-(O-benzoyloxime), and O-(acetyl)-N-(1-phenyl-2-oxo-2-(4'-methoxy-naphthyl)ethylidene) hydroxylamine. Examples of the phosphine compound include bis(2,4,6-trimethylbenzoyl)phenyl phosphine oxide and 2,4,6-trimethylbenzoyl diphenylphosphine oxide. Examples of the quinine compound include 9,10-phenanthrenequinone, camphorquinone, and ethylanthraquinone. These photopolymerization initiators may be used alone or in a combination of two or more of them. The amount of the photopolymerization initiator to be used preferably is in the range of 0.5% to 45% by weight based on the total amount of solids of photosensitive coloring composition. The amount of the photopolymerization initiator to be used is more preferably in the range of 3% to 30% by weight, yet more preferably in the range of 4% to 10% by weight.

Further, each of the coloring compositions preferably contains a sensitizer. As the sensitizer, for example, amine compounds such as triethanolamine, methyldiethanolamine, triisopropanolamine, 4-dimethylaminobenzoic acid methyl, 4-dimethylaminobenzoic acid ethyl, 4-dimethylamino benzoic acid isoamyl, benzoic acid 2-dimethylaminoethyl, 4-(dimethylamino)benzoic acid 2-ethylhexyl, N,N-dimethyl para toluidine, 4,4'-bis(dimethylamino)benzophenone, 4,4'-bis(diethylamino)benzophenone, and 4,4'-bis(ethylmethylamino)benzophenone can be used in a combination thereof. These sensitizers may be used alone or in a combination of two or more of them. Among these sensitizers, 4,4'-bis(dimethylamino)benzophenone and 4,4'-bis(diethylamino)benzophenone are preferable, and 4,4'-bis(diethylamino)benzophenone is more preferable. An amount of the sensitizer to be used preferably is in the range of 0.5% to 55% by weight based on the total amount of the photopolymerization initiator and the sensitizer. The amount of the sensitizer to be used is more preferably in the range of 2.5% to 40% by weight, and yet more preferably in the range of 3.5% to 25% by weight.

Further, the photosensitive coloring composition can contain a polyfunctional thiol that serves as a chain transfer agent. The polyfunctional thiol is not particularly limited as long as it is a compound having two or more thiol groups. Examples of the polyfunctional thiol include hexanedithiol, decanedithiol, 1,4-butanediol his thiopropionate, 1,4-butanediol bis thioglycolate, ethylene glycol bis thioglycolate, ethylene glycol bis thiopropionate, trimethylolpropane tris thioglycolate, trimethylolpropane tris thiopropionate, trimethylolpropane tris(3-mercapto butyrate), pentaerythritol tetrakis thioglycolate, pentaerythritol tetrakis thiopropionate, trimercaptopropionic acid tris(2-hydroxyethyl)isocyanurate, 1,4-dimethylmercaptobenzene, 2,4,6-trimercapto-s-triazine, and 2-(N,N-dibutylamino)-4,6-dimercapto-s-triazine. These polyfunctional thiols may be used alone or in a combination of two or more of them. An amount of the polyfunctional thiol to be used preferably is in the range of 0.1% to 30% by weight based on the total amount of solids of photosensitive coloring composition. The amount of the polyfunctional thiol to be used more preferably is in the range of 1% to 20% by weight.

The photosensitive coloring composition can be prepared in a solvent-development type color resist material or an alkali development type color resist material, for example. The color resist material is, for example the one obtained by dispersing a dye in a composition containing a thermoplastic resin, a thermosetting resin, or a photosensitive resin, and a monomer, a photopolymerization initiator, and a solvent. The dye preferably is contained in the range of 5% to 70% by weight based on the total amount of solids of photosensitive coloring composition. The dye more preferably is contained in the range of 20% to 50% by weight, and a remainder inherently is composed of a resin binder provided by a dye carrier.

Coarse particles and dust in the photosensitive coloring composition preferably are removed by the means such as centrifugation, a sintered filter, or a membrane filter. The sizes of the coarse particles to be removed are preferably 5 μm or more, more preferably 1 μm or more, and yet more preferably 0.5 μm or more.

The respective color ranges and the black matrix can be formed by a photolithography method, for example. According to the photolithography method, a color filter can be formed by the following procedures, for example. That is, first, a photosensitive coloring composition prepared as a solvent-development type or alkali-development type color resist material is applied on a transparent substrate by, for example, an applying method such as spray coating, spin coating, slit coating, or roller coating so that a dried film has a predetermined thickness. Next, the dried film is exposed to UV ray through a mask having a predetermined pattern, which is provided in the state of contacting with this film or not contacting with the same as necessary. Then, the non-cured part of the film can be removed, and a desired pattern can be formed by immersing the film in a solvent, an alkali developer, or the like or spraying the developer by a sprayer or the like. Further, the film can be heated to accelerate the polymerization of the color resist material as necessary. By forming the black matrix and the respective color ranges on a transparent substrate in sequence as above, a color filter can be formed on a transparent substrate. According to the photolithography method, the respective color ranges and the black matrix that have higher accuracy than that by the printing method can be formed. To increase sensitivity of the exposure to UV ray, it is also possible to form this film by applying and drying a color resist material and further applying and drying a water-soluble or alkali-soluble resin, and thereafter exposing this film to UV ray, for example. This is because of that inhibition of polymerization caused by oxygen can be prevented by the film. The water-soluble or the alkali-soluble resin contains polyvinyl alcohol, a water-soluble acryl resin, or the like, for example.

At the time of developing, an aqueous solution, an organic alkali, or the like can be used as the alkali developer, for example. Examples of the aqueous solution include sodium carbonate and sodium hydroxide. Examples of the organic alkali include dimethylbenzylamine and triethanolamine. Further, an antifoamer or a surfactant can be added in the developer, for example.

As the development processing method, a shower development method, a spray development method, a dip (immerse) development method, a puddle development (liquid development) method, or the like can be employed, for example.

A thin film (a transparent electrode film) composed of a transparent electrode material can be provided on a liquid crystal cell substrate by arranging the liquid crystal cell substrate in a chamber under reduced pressure and employing an appropriate thin film forming method according to the conventional method such as, for example, a sputtering method or a vapor deposition method. The deposition conditions such as the reduced pressure condition and the processing temperature also can follow the conventional conditions. At the time of providing, it is possible to directly form a transparent electrode film in the predetermined electrode pattern state. When a color filter is provided on a liquid crystal cell substrate, the transparent electrode film is formed on the color filter.

As the transparent electrode material, appropriate transparent electrode materials selected from, for example, indium oxide, tin oxide, ITO, gold, platinum, and palladium can be used alone or in a combination of two or more of them.

At the time of forming the transparent electrode film, adhesion can be caused to be improved by providing a liquid crystal cell substrate with one or two or more of appropriate under layer that is composed of a $SiO_2$ layer, a hydrolysate-polycondensation product of metal alkoxide, or the like. Providing a liquid crystal cell substrate with a $SiO_2$ layer as the under layer is preferable because warping caused by formation of a transparent electrode film can be prevented. The formation of the $SiO_2$ layer can be conducted by the method according to the above-described method for forming a transparent electrode film and the like.

In the under layer composed of hydrolysate-polycondensation product of metal alkoxide, inorganic oxide particles also can be contained in a dispersion state for the sake of further improving adhesion of a transparent electrode film and the like caused by an anchor effect and the like based on a convexo-concave structure. As the inorganic oxide particles, appropriate particles composed of, for example, silica, alumina, titanium oxide, antimony oxide, zirconia, and the like can be used, and alumina particles are particularly preferable.

Figure 3:
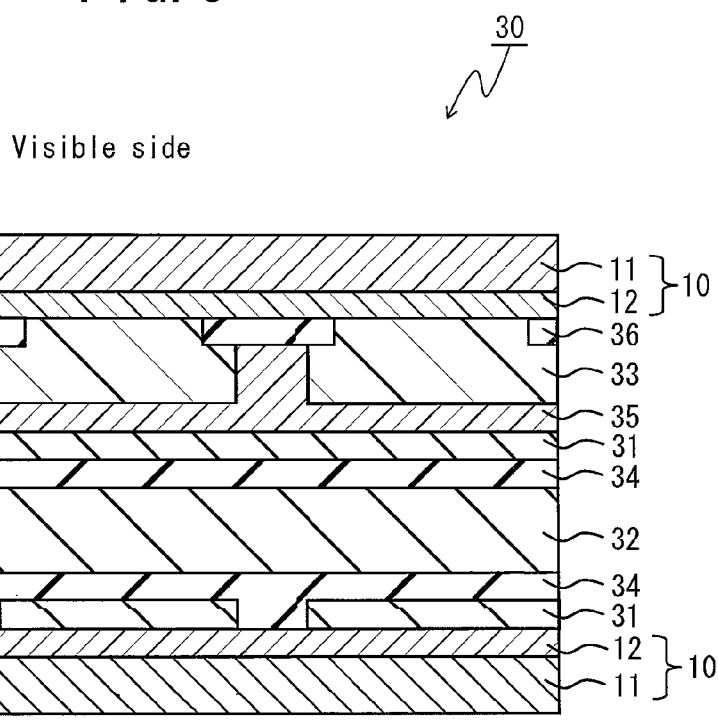
FIG. 3 is a schematic sectional view showing an example of the configuration of a liquid crystal cell of the present invention.

The liquid crystal cell substrate of the present invention preferably is used for forming a liquid crystal cell. As shown in the example in the schematic sectional view of FIG. 3, a liquid crystal cell 30 can be formed by a method according to the conventional method in which liquid crystal cell substrates 10 are arranged such that electrode patterned surfaces of transparent electrode films 31 provided on liquid crystal substrates 10 facing each other, and a liquid crystal layer 32 is interposed between the liquid crystal cell substrates 10. In the liquid crystal cell substrate 10 of the present invention, an optical compensation layer 12 is formed on a resin substrate 11, and the liquid crystal cell substrate 10 can be arranged so that the optical compensation layer 12 side faces to a liquid crystal layer 32. The resin substrate 11 and the optical compensation layer 12 may be formed through an adhesive layer or a pressure-sensitive adhesive layer (not shown). In the case of a liquid crystal cell of color display, a color filter 33 having a black matrix 36 is formed on a liquid crystal cell substrate 10 on a visibility side, and a transparent electrode film 31 is provided on the color filter 33. A protecting film 35 can be provided on the color filter 33. An alignment film 34 for a liquid crystal alignment is provided on a transparent electrode film 31 as necessary. Examples of the liquid crystal cell include a vertical alignment (VA) mode liquid crystal cell, a twisted nematic (TN) mode liquid crystal cell, an electric field controlled birefringence (ECB) mode liquid crystal cell of vertical alignment type, and an optical compensation birefringence (OCB) mode liquid crystal cell. For the above reason, a liquid crystal alignment mode of the liquid crystal cell in the present invention particularly preferably is the VA mode.

The liquid crystal panel of the present invention includes the liquid crystal cell of the present invention, and the liquid crystal display of the present invention includes the liquid crystal panel of the present invention. The liquid crystal display of the present invention may be a transmission type liquid crystal display in which the screen is seen by being irradiated with light from the backlight side of the liquid crystal panel, may be a reflection type liquid crystal display in which the screen is seen by being irradiated with light from the visibility side of the liquid crystal panel, or may be a semi-transmission type liquid crystal display having the properties of both the transmission type and the reflection type liquid crystal displays.

The liquid crystal display of the present invention is applicable to any suitable use. Examples of the use thereof include: office automation equipment such as computer monitors, notebook computers, and copy machines; portable devices such as mobile phones, watches, digital cameras, personal digital assistants (PDAs), and portable game devices; household electric appliances such as video cameras, televisions, and microwave ovens; vehicle-mounted devices such as back monitors, car navigation system monitors, and car audios; exhibition devices such as information monitors for commercial stores; security devices such as surveillance monitors; and nursing care and medical devices such as nursing-care monitors and medical monitors.

The liquid crystal display of the present invention has a particularly preferred use in notebook computers, above-described portable devices, and video cameras whose convenience at the time of use and commodity value are significantly improved by reducing the thicknesses and weights of them.

EXAMPLES

Next, examples of the present invention will be described. It is noted that the present invention is not limited by the following examples. Various characteristics and physical properties in the respective examples were evaluated and measured by the following methods.

(Thickness of Resin Substrate)

A thickness was measured with a micro-gauge thickness meter manufactured by Mitutoyo Corporation.

(Light Transmittance)

As a light transmittance, a transmittance at a wavelength λ of 550 nm was measured with a fast spectrophotometer (manufactured by Murakami Color Research Laboratory, product name "CMS-500", a halogen lamp is used).

(Glass Transition Temperature)

A glass transition temperature was measured according to a TMA method described in JIS C6481 (1996 version).

(Measurement of Refractive Index)

A retardation value (Re(λ) and Rth(λ)) at a wavelength λ, was measured with "KOBRA21-ADH" (product named) manufactured by Oji Scientific Instruments at 23° C.

Re(λ) was an in-plane retardation value of an optical compensation layer, and was calculated by an equation: Re(λ)= (nx−ny)×d at a wavelength λ (nm) at 23° C. Rth(λ) was a retardation value in the thickness direction of an optical compensation layer, and was calculated by an equation: Rth(λ)= (nx−nz)×d at a wavelength λ (nm) at 23° C. d was a thickness (nm) of an optical compensation layer.

(Measurement of Thickness)

When the thickness was less than 10 μm, the thickness was measured with a spectrophotometer for thin film (manufactured by Otsuka Electronics Co., Ltd., product name "multi channel photo detector MCPD-2000"). When the thickness was 10 μm or more, the thickness was measured with a digital micrometer ("K-351C type" (product name) manufactured by Anritsu Corporation).

(Indentation Hardness)

An indentation hardness (Microhardness) was calculated from an indentation depth and an indentation load with a thin-film hardness meter (product name, MH4000) manufactured by NEC corporation.

Reference Example 1

Production of Resin Substrate

A mixture composed of 100 parts by weight of an alicyclic epoxy resin represented by the following formula (1), 125 parts by weight of methyl hexahydrophthalic acid anhydride, and 1 part by weight of tri-n-butyl octyl phosphonium bromide was poured into a mold and was subjected to a curing treatment for 2 hours at 120° C. Thus, a 0.4 mm thick resin substrate was obtained. A light transmittance of the resin substrate was 92%, and a glass transition temperature of the same was 210° C.

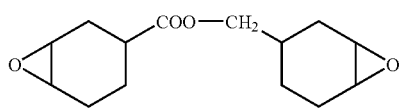

(1)

Reference Example 2

Preparation of Polyimide Solution

A 15% by mass polyimide solution was prepared by solving polyimide having a weight-average molecular weight (Mw) of 70,000 that is represented by the following formula (2) and is synthesized from 2,2-bis(3,4-dicarboxyphenyl) hexafluoropropane dianhydride (6FDA) and 2,2'-bis(trifluoromethyl)-4,4'-diamino biphenyl (TFMB) in cyclohexanone. It is to be noted that the preparation and the like of polyimide were conducted with reference to the method described in a document (F. Li et al. Polymer 40 (1999) 4571-4583).

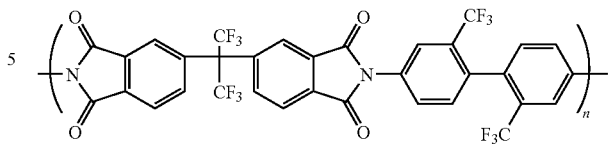

(2)

Example 1

Production of Liquid Crystal Cell Substrate

The polyimide solution of Reference Example 2 was applied on one side of the resin substrate of Reference Example 1 such that a thickness of a layer obtained by the application becomes 30 μm, and thereafter, the resin substrate was dried for 10 minutes at 120° C. Thus, a liquid crystal cell substrate having an optical compensation layer was obtained. The polyimide layer after drying had a thickness of 3 μm, satisfied Re(590)=0 nm and Rth(590)=250 nm, and exhibited negative uniaxiality satisfying nx=ny>nz. Further, the wavelength dispersion of this optical compensation layer exhibited a positive dispersion characteristic.

Example 2

The polyimide solution of Reference Example 2 was applied to a polyethylene terephthalate (PET) film (manufactured by Toray Industries, Inc., product name "LUMIRROR", a thickness of 60 μm) so that a thickness of a layer obtained by the application becomes 30 μm, and thereafter, the film was dried for 10 minutes at 120° C. Then, a 3 μm thick polyimide layer was formed on the PET film by stretching 10% the film by longitudinal uniaxial stretching at 150° C.

Next, the polyimide layer was transferred on one side of the resin substrate of Reference Example 1 through an urethane adhesive layer (manufactured by MITSUI TAKEDA CHEMICALS, INC., product name "M-631N", a thickness of 0.2 μm, an indentation hardness (Microhardness) of 0.2 GPa). Thus, a liquid crystal cell substrate having an optical compensation layer was obtained. The polyimide layer satisfied Re(590)=55 nm and Rth(590)=250 nm and exhibited biaxiality satisfying nx>ny>nz. Further, this optical compensation layer had wavelength dispersion satisfying Re(380) =65 nm and Re(680)=52 nm and exhibited a positive dispersion characteristic.

The liquid crystal cell substrates obtained in Examples 1 and 2 had high heat resistance and transparency, and could easily control optical characteristics as mentioned above. Further, reducing the thickness and the weight of the liquid crystal cell substrate could be achieved more successfully than a conventional glass substrate. Furthermore, a liquid crystal cell substrate whose optical characteristics were easily controlled as compared with that produced by the technology of Patent Document 1 could be produced.

INDUSTRIAL APPLICABILITY

Examples of the use of the liquid crystal cell substrate and the liquid crystal panel and a liquid crystal display using the same of the present invention include: office automation equipment such as computer monitors, notebook computers, and copy machines; portable devices such as mobile phones, watches, digital cameras, personal digital assistants (PDAs), and portable game devices; household electric appliances such as video cameras, televisions, and microwave ovens; vehicle-mounted devices such as back monitors, car navigation system monitors, and car audios; exhibition devices such as information monitors for commercial stores; security devices such as surveillance monitors; and nursing care and medical devices such as nursing-care monitors and medical monitors. There is no limitation on the use of the optical film and the liquid crystal panel using the same and the liquid crystal display of the present invention, and they are applicable to a wide range of fields.

While detailed embodiments have been used to illustrate the invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended limit the invention.

The invention claimed is:

1. A liquid crystal cell comprising:
   a pair of resin substrates;
   a liquid crystal layer held between the pair of resin substrates, and
   an optical compensation layer held between one of the pair of the resin substrates and the liquid crystal layer, wherein:
   the optical compensation layer has a refractive index distribution satisfying nx>ny>nz (nx: a refractive index in a direction (a slow axis direction) in which an in-plane refractive index of the optical compensation layer reaches its maximum, ny: a refractive index in a direction (a fast axis direction) that is orthogonal to the nx direction within a plane of the optical compensation layer, and nz a refractive index in a thickness direction of the optical compensation layer that is orthogonal to each of the nx and ny directions), and
   the optical compensation layer is formed by applying a material for forming an optical compensation layer to the resin substrate or by applying a material for forming an optical compensation layer to a base substrate that is different from the resin substrate.

2. The liquid crystal cell according to claim 1, wherein the optical compensation layer contains at least one non-liquid crystalline polymer selected from the group consisting of polyamides, polyimides, polyesters, polyetherketones, polyamideimides, and polyesterimides.

3. The liquid crystal cell according to claim 1, wherein the resin substrate contains at least one resin selected from the group consisting of polyolefin resins, polysulfide resins, epoxy resins, phenol resins, diallyl phthalate resins, polyimide resins, polyphosphazene resins, polyarylate resins, polyethersulfone resins, polysulfone resins, polymethyl methacrylate resins, polyetherimide resins, polyamide resins, poly diallyl phthalate resins, and poly isobonyl methacrylate resins.

4. A liquid crystal display comprising a liquid crystal cell according to claim 1.

5. A method for manufacturing the liquid crystal cell of claim 1, comprising:
   preparing a resin substrate; and
   forming an optical compensation layer by applying a material to the resin substrate,
   wherein the optical compensation layer has a refractive index distribution satisfying nx>ny>nz (nx: a refractive index in a direction (a slow axis direction) in which an in-plane refractive index of the optical compensation layer reaches its maximum, ny: a refractive index in a direction (a fast axis direction) that is orthogonal to the nx direction within a plane of the optical compensation layer, and nz: a refractive index in a thickness direction of the optical compensation layer that is orthogonal to each of the nx and ny directions).

6. The method according to claim 5, wherein the material contains at least one non-liquid crystalline polymer selected from the group consisting of polyamides, polyimides, polyesters, polyetherketones, polyamideimides, and polyesterimides.

7. The method according to claim 5, wherein the resin substrate contains at least one resin selected from the group consisting of polyolefin resins, polysulfide resins, epoxy resins, phenol resins, diallyl phthalate resins, polyimide resins, polyphosphazene resins, polyarylate resins, polyethersulfone resins, polysulfone resins, polymethyl methacrylate resins, polyetherimide resins, polyamide resins, poly diallyl phthalate resins, and poly isobonyl methacrylate resins.

8. A method for manufacturing a liquid crystal cell, comprising:
   forming an optical compensation layer by applying a material to a base substrate; and
   transferring the optical compensation layer from the base substrate to a resin substrate,
   wherein the optical compensation layer has a refractive index distribution satisfying nx>ny>nz (nx: a refractive index in a direction (a slow axis direction) in which an in-plane refractive index of the optical compensation layer reaches its maximum, ny: a refractive index in a direction (a fast axis direction) that is orthogonal to the nx direction within a plane of the optical compensation layer, and nz: a refractive index in a thickness direction of the optical compensation layer that is orthogonal to each of the nx and ny directions).

9. The method according to claim 8, wherein the material contains at least one non-liquid crystalline polymer selected from the group consisting of polyamides, polyimides, polyesters, polyetherketones, polyamideimides, and polyesterimides.

10. The method according to claim 8, wherein the resin substrate contains at least one resin selected from the group consisting of polyolefin resins, polysulfide resins, epoxy resins, phenol resins, diallyl phthalate resins, polyimide resins, polyphosphazene resins, polyarylate resins, polyethersulfone resins, polysulfone resins, polymethyl methacrylate resins, polyetherimide resins, polyamide resins, poly diallyl phthalate resins, and poly isobonyl methacrylate resins.

* * * * *